(12) United States Patent
Folk et al.

(10) Patent No.: US 6,220,175 B1
(45) Date of Patent: Apr. 24, 2001

(54) APPARATUS AND METHOD FOR MOUNTING A GENERATOR TO THE AXLE OF A RAILROAD CAR

(75) Inventors: Kenneth Foster Folk, Harrisburg; Donald James Good, Hummelstown, both of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 09/259,968

(22) Filed: Mar. 1, 1999

(51) Int. Cl.$^7$ ....................................... B61C 7/00
(52) U.S. Cl. .................. 105/136; 105/54; 105/157.1; 290/3
(58) Field of Search ..................... 105/136, 137, 105/133, 157.1, 54, 96, 96.1; 290/3

(56) References Cited

U.S. PATENT DOCUMENTS

| | | | | |
|---|---|---|---|---|
| 4,377,975 | * | 3/1983 | Scott et al. ........................... | 105/96.1 |
| 5,345,878 | * | 9/1994 | Jacob ................................... | 105/136 |
| 5,775,229 | * | 7/1998 | Folk et al. ........................... | 105/157.1 |
| 5,828,135 | * | 10/1998 | Barrett ................................. | 290/3 |
| 5,915,306 | * | 6/1999 | Langhorst et al. ................. | 105/157.1 |
| 6,049,138 | * | 4/2000 | Folk ..................................... | 290/3 |

* cited by examiner

*Primary Examiner*—S. Joseph Morano
*Assistant Examiner*—Lois A. Olson

(57) ABSTRACT

An apparatus and a method of mounting a standard size power generating unit (30) to any one of several different sized railroad cars utilizes different sized interface blocks (28) to mate the unit to the bearing adapter blocks (14) of the cars. The axle (32) of the car includes a projection (18) extending from an end (16) thereof and the power generating unit (30) includes a frame (50) and a rotor arranged for rotation in the frame for generating the power. A drive shaft (74) is attached to the rotor and includes a follower (78) for engaging the projection (18) so that when the axle is rotated about the axis (44), the projection engages the follower and thereby rotates the rotor. The interface block (28) is disposed between the frame (50) and the bearing adapter block (14), a first surface (54) of the interface block being attached to the bearing adapter block (14) and the frame (50) being attached to a second surface (56) of the interface block opposite the first surface.

10 Claims, 4 Drawing Sheets

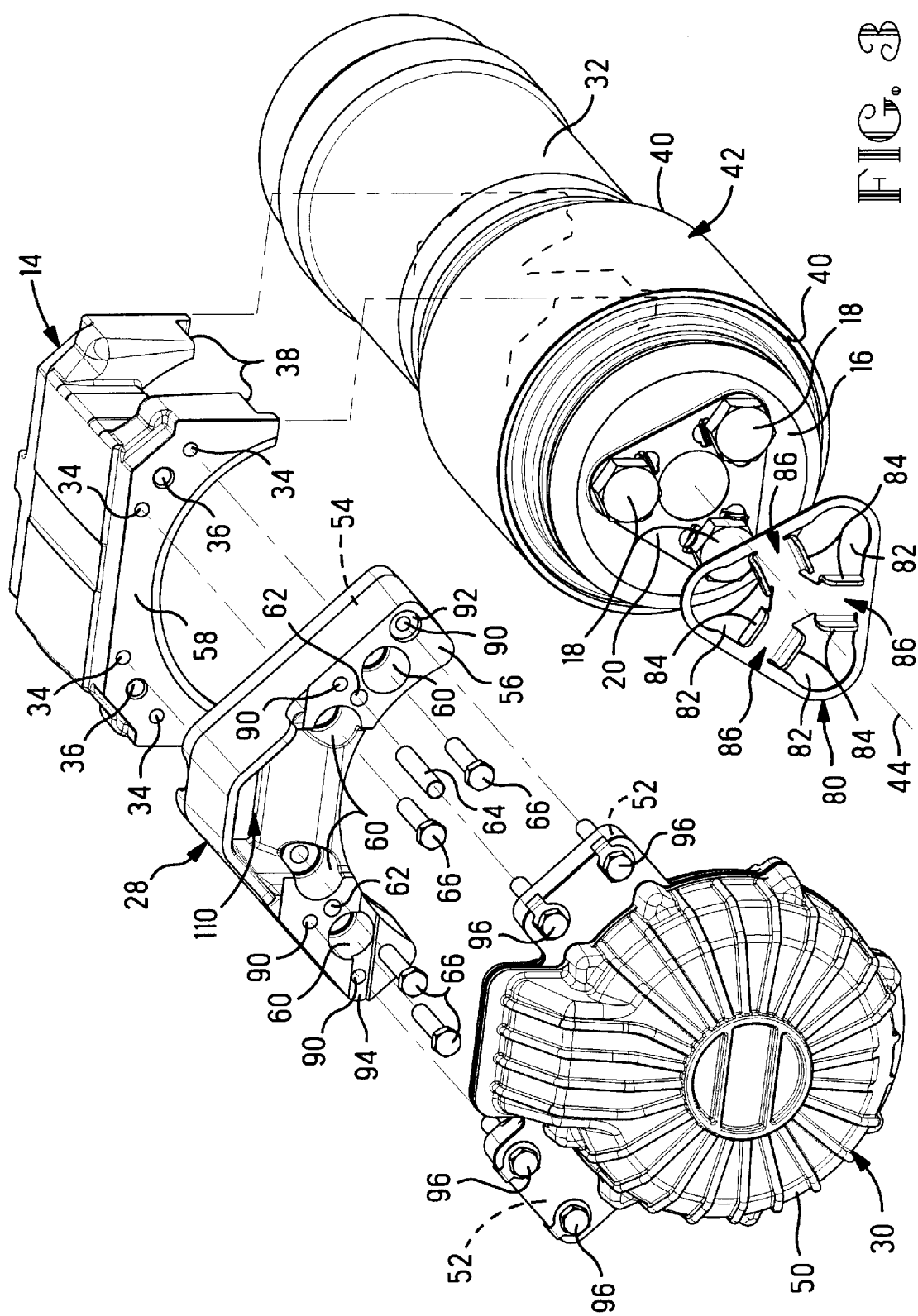

# APPARATUS AND METHOD FOR MOUNTING A GENERATOR TO THE AXLE OF A RAILROAD CAR The present invention is related to railroad car generators that are coupled to an axle of the railroad car for generating electrical power for powering various electrical devices and, more particularly to apparatus and a method of mounting a particular generator to any one of several different sized railroad cars.

BACKGROUND OF THE INVENTION

Electrical energy is sometimes generated by attaching a generator or alternator to the frame of a vehicle and coupling the rotor of the device to the axle of the vehicle. As the vehicle axle rotates the device rotor also rotates thereby generating the desired electrical energy. Such power generating devices are used in the railroad industry and take many different forms. A serious objection to most of these devices is that they are coupled to the railroad car axle in such a way that the bearing end cap of the axle must be either temporarily removed, modified, and replaced or a different end cap must be substituted. The reason that this is undesirable is that this disturbs the axle bearing when removing the bearing end cap and requires the skill of a workman that is specifically trained in this procedure. Such skilled workmen are normally only found in central work shops necessitating sending each railroad car that is to be retrofitted with one of these power generating devices to the central work shop for installation. Additionally, the special bearing end caps must be stocked by the railroad yards, thereby introducing additional inventory problems. It is, therefore, desirable to couple the power generating device to the railroad car without disturbing the bearing end cap so that the installation can be accomplished in the field by a less skilled workman. The power generating device is secured to the truck or carriage of the railroad car by means of bolts which are threaded into the bearing adapter block of the vehicle. The rotor of the power generating device has a drive shaft that is in alignment with the vehicle axle. A drive coupling is attached to the end of the bearing end cap in driving engagement with the rotor of the power generating device. As the vehicle axle rotates the coupling rotates the rotor. There are several different sized railroad car carriages, or trucks, which include bearing adapter blocks which are different sizes and different distances from their respective axle ends. Each different sized carriage requires a power generating unit that is made to fit that specific carriage.

What is needed is an interface block that will receive a standard sized electrical power device such as a power generating unit, but will mount to any of the different sized bearing adapter blocks of the different sized carriages, thereby permitting the use of a single power generating unit on any of a variety of railroad cars having different sized carriages.

SUMMARY OF THE INVENTION

An electrical power device is provided for coupling to a railroad car. The railroad car has a bearing adapter block and an axle rotationally coupled to the bearing adapter block arranged for rotation about an axis. The axle includes a projection extending from an end thereof. The electrical power device includes a frame, a stator attached to the frame, and a rotor arranged for rotation in the frame. A drive member is attached to the rotor and includes an abutting surface for engaging the projection so that when the axle is rotated about the axis, the projection engages the abutting surface and thereby rotates the rotor. An interface block is disposed between the frame and the bearing adapter block. A first surface of the interface block is attached to the bearing adapter block and the frame is attached to a second surface of the interface block opposite the first surface.

An embodiment of the invention will now be described by way of example with reference to the following drawings.

DESCRIPTION OF THE FIGURES

FIG. 3 is and exploded parts view of the power generating unit of the present invention showing how it is mounted to the bearing adapter block;

DESCRIPTION OF AN EMBODIMENT OF THE INVENTION

Figure 1:
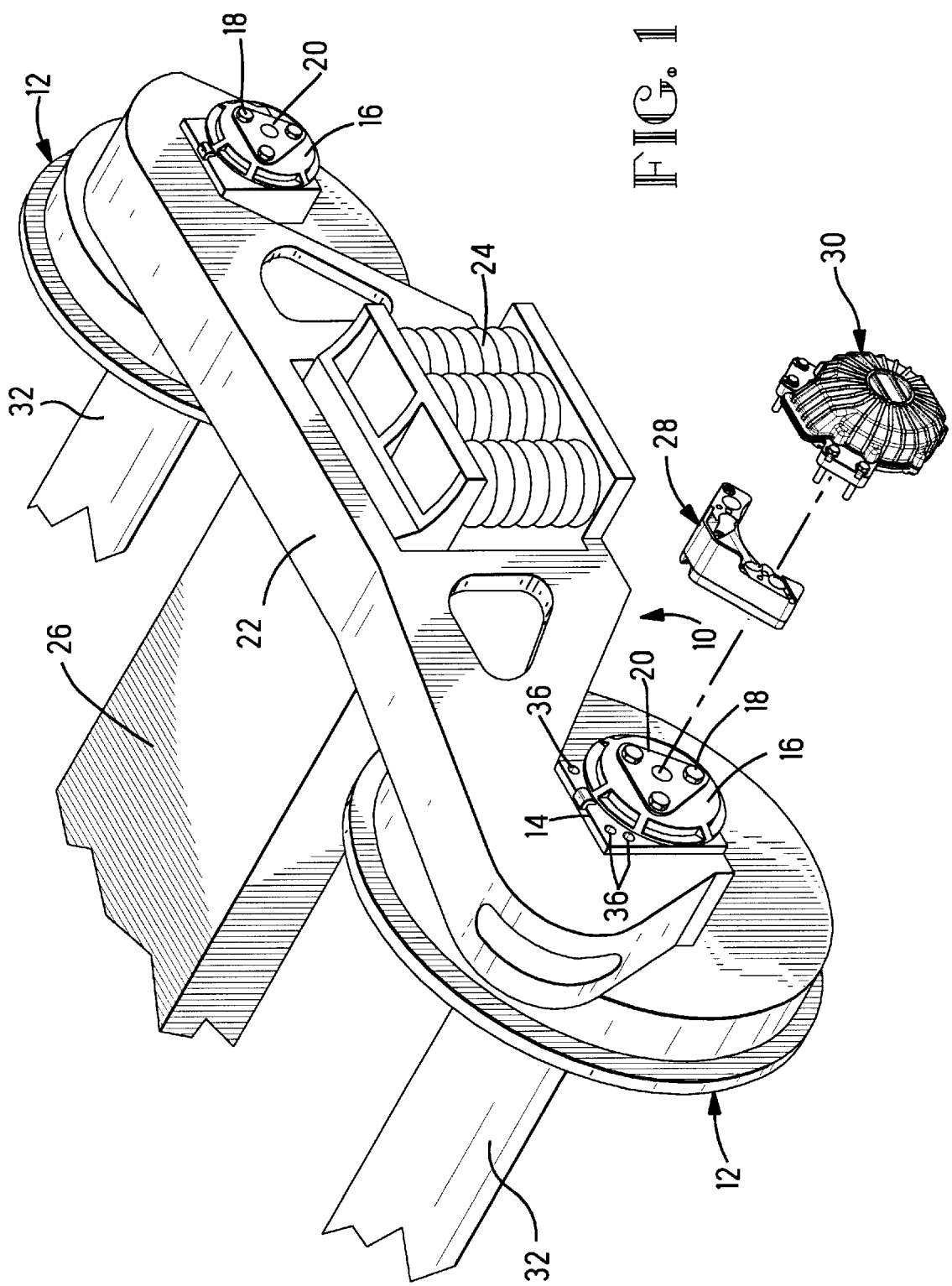
FIG. 1 is an isometric view of a portion of a railroad car truck, or carriage, showing a power generating unit and interface block according to the teachings of the present invention.
Figure 2:
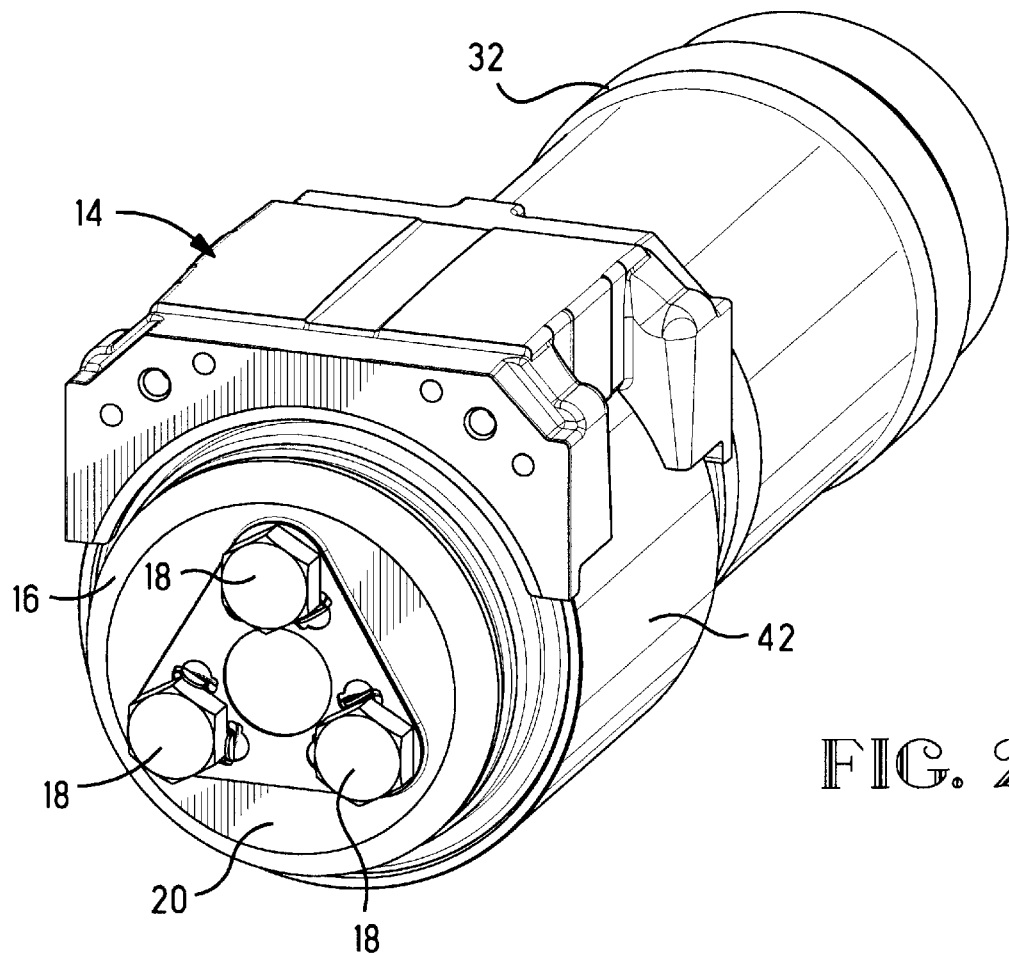
FIG. 2 is an isometric view of a portion of the axle of the railroad car truck of FIG. 1 showing the bearing and bearing adapter block.

FIG. 1 shows a railroad car truck assembly 10 which includes a rotatable axle and wheel assembly 12. The axle is rotatably received in a bearing adapter block 14. The bearing adapter block 14 includes a standard bearing end cap 16 for retaining the axle bearing assembly in place. The bearing end cap 16 is bolted to the end of the axle by means of bolts 18 in the usual manner. A washer plate 20 having locking tabs is provided to lock the bolts 18 in place. The bearing adapter block 14 supports a truck side frame 22 so that the axle and wheel assembly 12 rotates freely relative to the truck side frame 22. The truck side frame 22 supports suspension springs 24 that, in turn, support a bolster 26. The bolster 26 comprises an integral part of a rail car, for example, a box car or flat car (not shown). An alternator 30 is rigidly attached to the adapter block 14 by means of an interface block 28, in a manner that will be described in further detail below. The axle and wheel assembly 12 includes an axle 32, a portion of which is shown in FIG. 2 with the bearing adapter block 14 in place. The bearing end cap 16 is shown held in place by the bolts 18 and the washer plate 20. This partial assembly of these parts to the end of the axle 32 illustrates the state of the axle end just prior to mounting the power generating unit 30.

Figure 4:
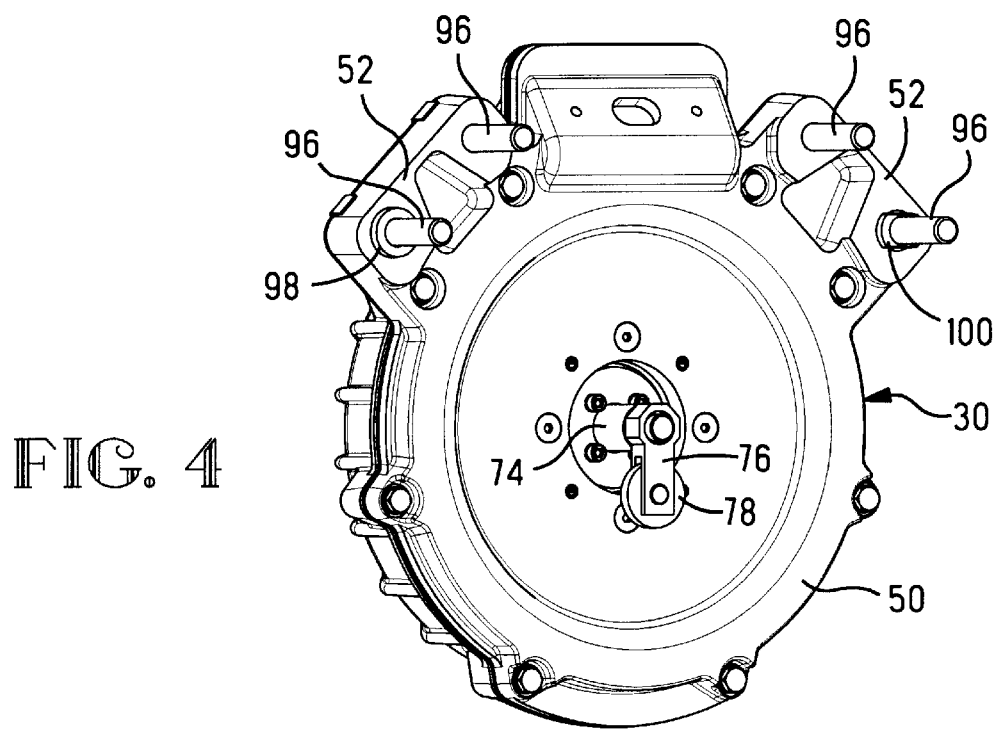
FIG. 4 is an isometric view of the rear of the power generating unit shown in FIG. 3.
Figure 5:
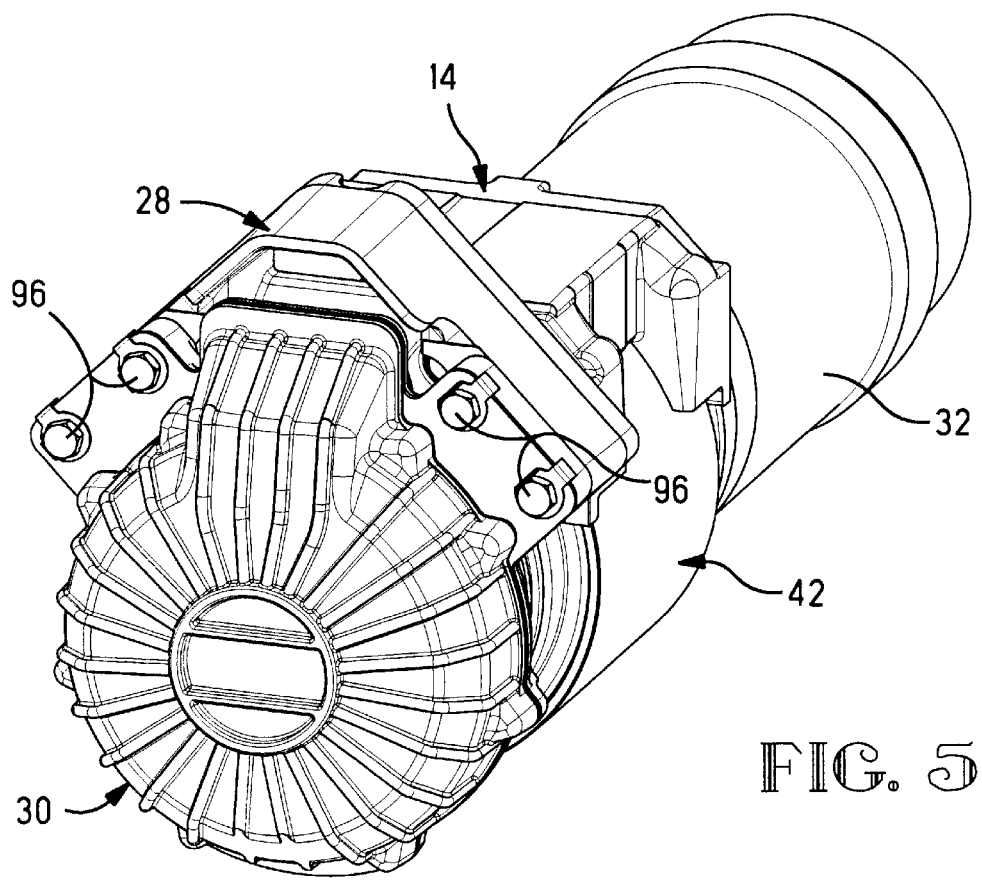
FIG. 5 is an isometric view of the axle shown in FIG. 2 with the power generating unit of FIG. 3 in place.

As best seen in FIG. 3, the bearing adapter block 14 has four threaded holes 34 and two slip fit dowel pin holes 36 formed therein. Otherwise, the bearing adapter block 14 is similar to a prior art bearing adapter block. The bearing adapter block 14 includes radiused bearing receiving cutouts 38 that engage the side edges 40 of the bearing 42 in the usual manner and permits rotation of the axle 32 about an axis 44. For each different sized railroad car there is a corresponding different sized bearing adapter block 14. The standard sized power generating unit 30 is mounted to each different sized bearing adapter block 14 by means of a correspondingly sized interface block 28. The power generating unit 30, as best seen in FIG. 4, includes a frame 50 having mounting faces 52 that face inwardly toward the bearing adapter block 14. The interface block 28 includes oppositely formed and parallel first and second surfaces 54 and 56, respectively, the first surface facing an outwardly facing side surface 58 of the bearing adapter block 14, and the second surface facing the mounting surface 52. Four counterbored clearance holes 60 are formed in the interface block 28 in alignment with the threaded holes 34, and two slip fit pin holes 62 are formed through the interface block 28 in alignment with the pin holes 36 in the bearing adapter block 14. A dowel pin 64 extends through each pair of pin holes 36 and 62 to accurately position the interface block 28 with respect to the axis 44 and the bearing end cap 16. Four bolts 66 extend through the holes 60 and into the threaded holes 34 to secure the first surface 54 of the interface block 28 tightly against the side surface 58 of the bearing adapter block 14.

Figure 6:
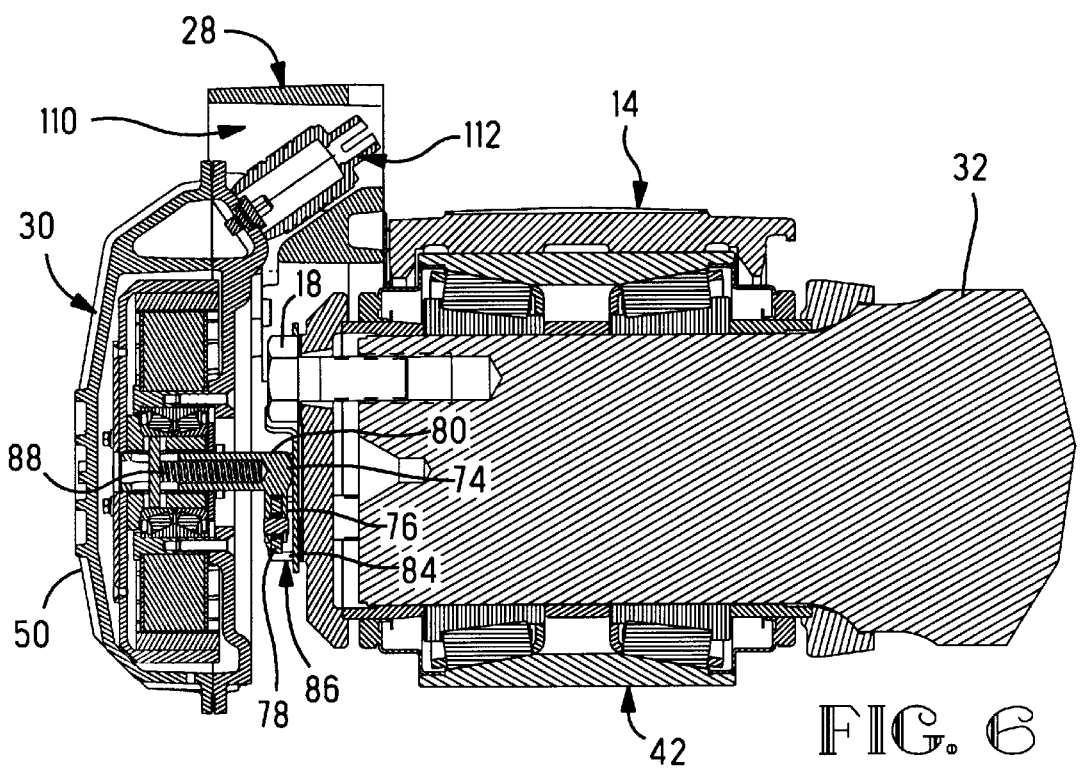
FIG. 6 is a cross-sectional view taken along the lines 6—6 in FIG. 5.

As best seen in FIG. 4, the power generating unit includes a drive shaft 74 that is attached to a rotor within the power generating unit. A crank arm 76 extends laterally from the end of the drive shaft and includes a follower 78. As best seen in FIG. 3, a drive plate 80 having three equally spaced openings 82 is arranged to seat against the bearing end cap 16 with the heads of the three bolts 19 extending into respective openings 82. A pair of drive tabs 84 are bent outwardly from the drive plate adjacent each opening 82. The drive tabs 84 are perpendicular to the drive plate, and opposing tabs of adjacent openings 82 are mutually parallel. As best seen in FIGS. 3 and 6, the crank arm 76 extends into a space 86 between an opposing pair of drive tabs 84. It will be understood that each of the three pairs of opposing drive tabs has a similarly sized space 86 therebetween. The curved surface of the follower 78 on the end of the crank arm 76 is in engagement with the drive tabs and will minimize gouging of the tabs and provide a smooth drive coupling. The drive tabs 82 prevent direct contact between the follower 78 and the heads of the bolts 18, thereby obviating possible wear of the bolt heads. The openings 82 are sized so that the bolt heads extend freely into the openings with little rotational play. A compression spring 88 gently urges the drive shaft 74 toward the drive plate 86 so that a spherical end of the drive shaft is maintained in engagement with the drive plate, thereby urging the drive plate against the washer plate 20, as shown in FIG. 6. The drive plate 86 is freely floating between the end of the drive shaft and the bearing end cap, and is retained in operating position, as shown in FIG. 6, solely by the proximity of the drive shaft 74 to the bearing end cap 16 and by the bolt heads extending into the openings 82. The above described rotor coupling and drive plate are described in more detail in pending patent application Ser. No. 09/120,483, which was filed on Jul. 22, 1998, assigned to the present assignee, and having attorney's docket number 17218. Two pairs of threaded holes 90 are formed in the second surface 56 of the interface block 28, as best seen in FIG. 3, one of which has a counterbore 92 and the other has a laterally positioned slot 94 formed in the surface 56. Four bolts 96 extend through holes in the frame 50 so that each bolt is in alignment with a respective threaded hole 90. As best seen in FIG. 4, a pair of locating sleeves 98 and 100 extend outwardly from the mounting face 52 of the frame 50, each of the two outermost bolts 96 extending through the center of a respective one of the locating sleeves. One of the locating sleeves 98 is a slip fit with the counterbore 92 and the other locating sleeve 100 is a sliding fit with the walls of the slot 94. When the mounting face 52 is secured against the second surface 56 by tightening the bolts 96, the counterbore 92 and its locating sleeve 98 accurately position one portion of the power generating unit 30 with respect to the axis 44, and the other locating sleeve 100 and the slot 94 accurately position another portion of the unit. This assures that the axis of the drive shaft 74 is nominally coincident with the axis 44 of the axle 32. Further, the slot 94 allows for some variation in tolerance differences between the parts and for different thermal expansion and contraction rates.

As best seen in FIGS. 3 and 6, the interface block 28 includes a wedge-shaped opening 110 that is arranged to receive an electrical connector 112 that extends from the upper portion of the frame 50. The electrical power generated by the unit 30 is conveyed through electrical wires, not shown, that are terminated to the connector 112. The connector 112 and the terminated wires are thereby protected within the wedge-shaped opening from accidental contact with foreign objects that may damage the delicate connections. As stated above, each different sized railroad car has a correspondingly different sized bearing adapter block 14 and a correspondingly different interface block 28. All of the different interface blocks 28 have threaded holes 90, counterbore 92, and slot 94 for securing the standard power generating unit 30 thereto, as set forth above, so that the axis of the drive shaft 74 is nominally coincident with the axis 44 of the axle 32, for each respective railroad car.

When assembling the power generating unit to the railroad car, the bearing adapter block 14 is removed and replaced with a similar bearing adapter block having the threaded holes 34 and the slip fit pin holes 36 formed therein. Alternatively, these holes may be formed in the bearing adapter block 14 that is currently on the railroad car. In either case, the interface block 28 is positioned against the side surface 58, the dowel pins 64 inserted into the pin holes 62 and 36 so that the interface block is properly positioned, and the bolts 66 inserted through the holes 60 and into the threaded holes 34 and tightened. The drive plate 86 is then positioned against the washer plate 20, if one is present, or against the bearing end cap 16 if not present, and the power generating unit 30 positioned as shown in FIG. 6 so that the spherical end of the drive shaft 74 is against the drive plate 86. Concurrently, the electrical wires or cable from the connector 112 are routed through the wedge-shaped opening 110. The power generating unit 30 is then rocked slightly to cause the locating sleeve 98 to enter the slip fit counterbore 92 and the other locating sleeve 100 to enter between the walls of the slot 94. The bolts 96 are then inserted through the clearance holes in the frame 50 and into the threaded holes 90 and tightened. The electrical wires from the connector 112 are then routed as desired. This completes the installation of the power generating unit 30 to the railroad car.

An important advantage of the present invention is that a standard power generating unit having a standard mounting configuration can be mounted to a variety of different sized railroad cars, thereby eliminating the need to stock several different sized power generating units. Another important advantage is that the installation of the power generating unit can be accomplished in the regular work yard by the lower skill level mechanics that work there, rather than requiring the relatively higher skill level found only at the central work shop. This lower skill level work involves only the replacement of the bearing adapter block or, alternatively, the drilling and tapping of mounting holes in the old bearing adapter block. This is done without disturbing the bearing end cap resulting in a simplified and less expensive retrofit.

What is claimed is:

1. Apparatus for mounting a standard size electrical power generator having a frame to any one of a plurality of different railroad cars each of which has a different sized bearing adapter block corresponding thereto, said apparatus comprising:

(1) a plurality of interface blocks each having first and second opposite surfaces, each of said interface blocks corresponding to a respective different size of said bearing adapter block;

(2) means for securing said first surface of one of said interface blocks to a surface of its corresponding said bearing adapter block; and (3) means for securing said frame of said standard size electrical power generator to said second surface of said one of said interface blocks.

2. The apparatus according to claim 1 wherein said frame of said electrical power generator is arranged to attach to said second surface of each respective one of said plurality of interface blocks.

3. The apparatus according to claim 2 wherein each of said plurality of different railroad cars includes:

an axle rotationally coupled to its said bearing adapter block and arranged for rotation about an axis, a projection extending from an end of said axle, a drive member coupled to said electrical power generator having an abutting surface for engaging said projection so that when said axle is rotated about said axis, said projection engages said abutting surface and thereby operates said electrical power generator.

4. The apparatus according to claim 2 wherein said interface block is accurately positioned with respect to said bearing adapter block by means of locating pins extending through holes in both said bearing adapter block and said interface block, and wherein said frame is accurately positioned with respect to said interface block by means of first and second locating sleeves extending from said frame, said first locating sleeve extending into a slip fit counterbore in said interface block and said second locating sleeve extending between opposing walls of a slot formed in said interface block.

5. The apparatus according to claim 2 wherein said first surface of said interface block is attached to said bearing adapter block by means of screws extending through clearance holes in said interface block and into threaded holes in said bearing adapter block, and wherein said frame is attached to said second surface by means of screws extending through clearance holes in said frame and into threaded holes in said interface block.

6. A method of attaching an electrical power generator to a railroad car having a bearing adapter block and an axle rotationally coupled to said bearing adapter block arranged for rotation about an axis, said axle having a projection extending from an end thereof, wherein said electrical power device includes: a frame; a rotor arranged for rotation in said frame in the generation of electrical power; and a drive member attached to said rotor, said drive member having an abutting surface for engaging said projection so that when said axle is rotated about said axis, said projection engages said abutting surface and thereby rotates said rotor, including an interface block disposed between said frame and said bearing adapter block, wherein a first surface of said interface block is attached to said bearing adapter block and said frame is attached to a second surface of said interface block opposite said first surface, the steps of:

(1) providing a bearing adapter block corresponding to said railroad car having means for attaching an interface block thereto;

(2) selecting an interface block from a plurality of different interface blocks that corresponds to said provided bearing adapter block;

(3) attaching a first surface of said interface block to said provided bearing adapter block; and (4) attaching said frame of said electrical power generator to a second surface of said interface block opposite said first surface.

7. The method according to claim 6 including the step of forming threaded holes in said bearing adapter block in alignment with mounting holes in said selected interface block, and wherein step (2) includes installing screws through said mounting holes and into threaded engagement with respective said threaded holes.

8. The method according to claim 7 wherein step (3) includes installing screws through clearance holes in said frame and into threaded engagement with respective threaded holes in said interface block.

9. The method according to claim 8 including the step of placing a drive plate between said drive member and said projection.

10. The method according to claim 8 including the step of forming a counterbore and a slot in said second surface of said interface block, and providing two locating sleeves extending from said frame so that one of said locating sleeves locates within said counterbore and the other of said locating sleeves locates between the walls of said slot.

* * * * *